May 30, 1967            L. PÉRAS            3,321,988

ANTI-VIBRATION ELASTIC TRANSMISSION DEVICES

Filed June 25, 1964            2 Sheets-Sheet 1

Inventor
Lucien Péras
By Stevens, Davis, Miller & Mosher
Attorneys

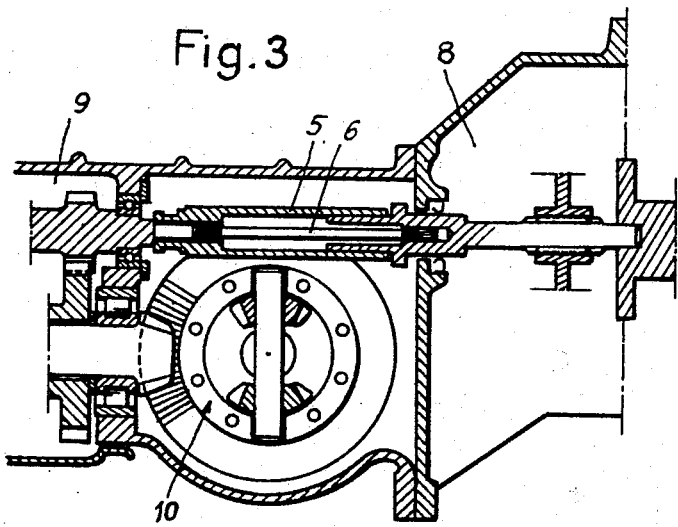
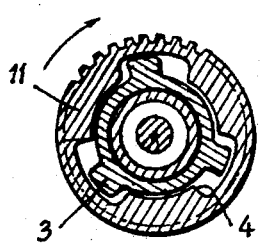
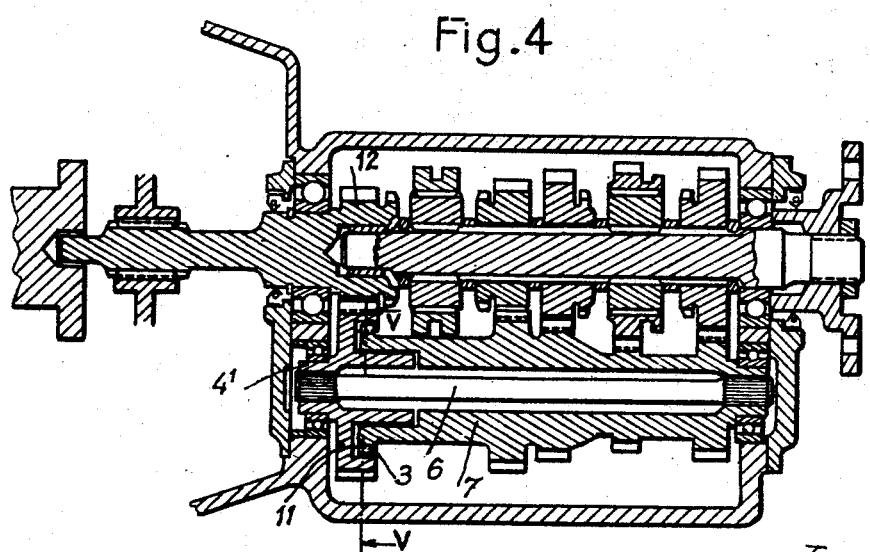

346 United States Patent Office 3,321,988
Patented May 30, 1967

3,321,988
ANTI-VIBRATION ELASTIC TRANSMISSION
DEVICES
Lucien Péras, Billancourt, France, assignor to Regie Nationale des Usines Renault, Billancourt, France
Filed June 25, 1964, Ser. No. 377,931
Claims priority, application France, Aug. 20, 1963,
945,159, Patent 1,373,805
2 Claims. (74—411)

The present invention relates to antivibration elastic transmission devices for couplings which more particularly find their application in automobile vehicles.

Elastic devices are already known, especially between the engine and the gearbox of automobile vehicles, arranged in the clutch between the hub and the disc with the object of reducing vibration or irregularities in the drive, which are the source of noise generally known by the name of "trash", due to spring-back in the rotational play of splines and teeth under the action of the said irregularities in torque.

These systems, constructed for example by means of springs, have certain drawbacks. The introduction of a certain number of damping springs in the clutch disc increases its inertia, and on the other hand, the springs only permit small angular displacements of the hub with respect to the disc.

The difficulty of exactly balancing these springs is a source of noise, especially when the transmitted torque becomes reversed.

As has been shown by experience, it is necessary that the springs should be pre-stressed as little as possible. Now, the conventional method of assembly requires a pre-stress which is not negligible, in order to avoid chattering of the springs.

Finally, certain clutches, such as those of the magnetic powder type, do not permit in certain cases the provision of an elastic hub, for reasons of overall size or of operation (inertia too high, or low tolerances for centering or buckling).

The device according to the invention, based on the new utilization of a hub known per se, the torsion bar, overcomes these drawbacks and in addition offers various advantages which will become apparent in the text which follows.

The device is particularly suitable for a compact engine-transmission unit.

In a unit of this kind, it may be installed in the vicinity of the differential so as to form the coupling between the clutch and the gear-box by virtue of its small diametral size. Its form enables it to be given a length of any size corresponding to the desired degree of elasticity, while the angular play or relative movement may also be determined at will. In addition, the simple construction of the device and the case of its assembly make it very economical.

In the accompanying drawings:

FIG. 3 shows an example of the assembly of device of this kind in an engine-transmission unit for automobiles;

FIG. 4 represents the assembly of a device according to the invention in a conventional gear-box for automobiles;

FIG. 5 is a partial cross-section taken along the line V—V of FIG. 4.

Figure 1:
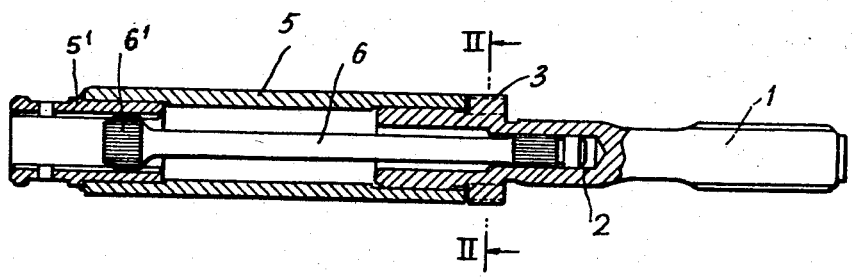
FIG. 1 is a cross-section taken in a plane passing through the axis of an elastic device in accordance with the invention.

With reference to FIG. 1, it can be seen that the driving shaft 1 comprises a cylindrical hollow portion in which is fixed without play at 2, one of the extremities of the torsion bar 6, the bar being preferably fluted and mounted with a force fit in the hollow portion of the shaft 1.

Externally, the shaft 1 comprises one or more radial tenons 3, which are introduced into the grooves 4 of a sleeve $4^1$ rigidly fixed to the driven tubular portion 5.

Figure 2:
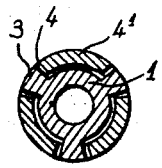
FIG. 2 is a cross-section taken along the line II—II of FIG. 1.

FIG. 2 represents a cross-section along the line II—II of FIG. 1, and shows the function of the sleeve $4^1$ as an abutment limiting the torsion of the bar, which may have a large amplitude. The torsion bar 6 is fixed also without play at its opposite extremity at $6^1$ in the tube $5^1$ fixed to the tube 5, and the end portion of which receives the primary shaft of the gear-box. From the appearance of the device, it it quite clearly seen that its rotational inertia is small by reason of its small diameter, and that its mounting in position does not require any additional labour.

FIG. 3 represents an application of the transmission device 5, 6 of the invention which is particularly suitable to the grouping together of the transmission coupled to the engine in a compact unit at the front or at the rear of the vehicle. The small radial size of the device permits its installation in the space available between the clutch housing 8 and the housing 9 of the gear-box, above the differential 10.

In the application illustrated in FIG. 4, to a gear-box of conventional type, the torsion bar 6 is arranged in the hollow intermediate shaft 7 which carries the pinions in engagement with the pinions of the primary shaft and of the transmission shaft to the differential. The bar 6 drives the sleeve $4^1$ carrying the pinion 11 in engagement with the pinion 12 of the primary shaft. The limitation of the torsion of the bar is obtained by the lost-motion connection between the tenons 3 of the hollow shaft 7 and the slots 4 of the sleeve $4^1$. The bar thus acts on the transmission of the movement in the first, second, third gears and reverse, and not on the fourth gear or direct drive (upper shaft) on which its action is not necessary.

What is claimed is:

1. A gear assembly comprising a geared input shaft adapted to be driven by external means, a geared output shaft adapted to drive a differential, a geared intermediate hollow shaft radially spaced from said input shaft and said output shaft, means for selectively drivingly engaging said input shaft and said intermediate shaft, a torsion bar extending within said intermediate shaft and having one end fixed to one end of said intermediate shaft, a geared sleeve fixed to the other end of said bar, said sleeve being in operative engagement with said output shaft, a lost-motion connection between said sleeve and said intermediate shaft to limit the torsional movement of said bar, and means selectively directly connecting said input shaft and said output shaft.

2. The assembly of claim 1, wherein said lost-motion connection comprises radial slots provided in said sleeve and radial tenons extending from the other end of said intermediate shaft and adapted to extend into said slots.

(References on following page)

References Cited

UNITED STATES PATENTS

| | | | |
|---|---|---|---|
| 1,636,262 | 7/1927 | Troendly | 64—1 |
| 2,118,811 | 5/1938 | Fageol | 74—700 |
| 2,126,876 | 8/1938 | Doman | 74—700 |
| 2,194,929 | 3/1940 | Eckert | 74—700 |
| 2,459,705 | 1/1949 | Julien | 74—700 |
| 2,738,660 | 3/1956 | Gailq | 64—1 |
| 2,776,556 | 1/1957 | Gustafson et al. | 64—27 |
| 2,895,315 | 7/1959 | Fishtahler | 64—27 |
| 3,062,023 | 11/1962 | Stolworthy | 64—1 |
| 3,109,317 | 11/1963 | Cousino et al. | 74—411 |
| 3,128,943 | 6/1964 | Gustki | 64—27 |
| 3,159,987 | 12/1964 | Thompson et al. | 64—27 |

FOREIGN PATENTS 24,775  12/1956  Germany.

DONLEY J. STOCKING, *Primary Examiner*.

DAVID J. WILLIAMOWSKY, *Examiner*.

J. R. BENEFIEL, *Assistant Examiner*.